United States Patent Office 3,642,834
Patented Feb. 15, 1972

3,642,834
PREPARATION OF OLEFIN OXIDE
Yoshiaki Suzuki, Tokyo, and Akira Yamura and Kenichiro Fukasawa, Kanagawa-ken, Japan, assignors to Mitsubishi Chemical Industries Limited
No Drawing. Filed Aug. 7, 1969, Ser. No. 848,348
Claims priority, application Japan, Aug. 23, 1968, 43/60,385; Sept. 14, 1968, 43/65,947
Int. Cl. C07d 1/08
U.S. Cl. 260—348.5 V
10 Claims

ABSTRACT OF THE DISCLOSURE

An olefin is oxidized with molecular oxygen in a liquid reaction medium. The oxidation is conducted in the presence of an arsenic catalyst. A polycyano compound having the formula

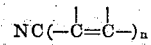

CN may be used in conjunction with the arsenic catalyst. The olefin oxide yield is greatly increased while the decomposition of the reaction medium is greatly decreased.

---

This invention relates to a process for the preparation of olefin oxides. Particularly, the invention relates to a process for the preparation of olefin oxides in which an olefin is oxidized in a liquid reaction medium with molecular oxygen. More particularly, the invention relates to a novel catalyst for use in a liquid phase oxidation of an olefin wherein molecular oxygen is employed as the oxidizing agent.

Processes for the liquid phase oxidation of olefins which employ molecular oxygen are known in the art. For example, U.S. Pats. Nos. 3,210,381, 3,228,968 and 3,228,967 disclose oxidation processes in which an olefin of ethylenic or cycloethylenic group having not more than 18 carbon atoms, preferably 2 to 8 carbon atoms per molecule such as ethylene, propylene, butenes, pentenes, hexenes, cyclopentenes and cyclohexenes, is used in a liquid phase oxidation employing molecular oxygen. These U.S. patents further disclose that alkyl substituted olefins such as 2-methyl-1-butene and 2-methyl-2-pentene, conjugated or non conjugated dienes such as butadiene and isoprene, vinyl substituted benzenes such as 4-methyl styrene and unsaturated high molecular hydrocarbons are also used in liquid phase oxidations employing molecular oxygen. Still further, said U.S. patents refer to the effects of the solvent employed in the liquid phase oxidation of the abovementioned olefins, catalysts, reaction initiators, reaction conditions, and steps of operating reactions.

However, said known processes for the liquid phase oxidation of olefins have been found to be unsatisfactory because they afford a low yield of olefin oxides. Moreover, with the conventional processes, as the oxidation rate of the olefin is increased the selectivity of the olefin oxide is decreased.

We have found that the employment of the catalyst of the present invention in said oxidation reaction gives rise to a remarkable increase in the yield of olefin oxides.

Accordingly, an object of the present invention is to provide a process for the preparation of olefin oxides which process affords a good yield.

Another object of the invention is to provide a novel catalyst for use in the preparation of olefin oxides. A further object of the invention is to provide a process for the economical preparation of olefin oxides in which process there is no loss of reaction medium due to decomposition.

These objects are readily accomplished according to the invention by subjecting an olefin to liquid phase oxidation with molecular oxygen in the presence of an arsenic catalyst selected from the group consisting of elemental arsenic, inorganic arsenic compounds, and organic arsenic compounds.

More precisely, the invention contemplates the use of novel catalysts in the conventional liquid phase oxidation process of an olefin with molecular oxygen. The term "molecular oxygen" as used herein means oxygen gas or oxygen-containing gases such as for example air. The invention finds its wide application in the liquid phase oxidation known per se similarly as the conventional oxidation process does. The process according to the present invention is especially advantageous when it is applied to the liquid phase oxidation of linear olefins such as ethylene, propylene, butenes, and hexenes which are represented by the formula, —CH=CH—.

Difficulties arise when conventional processes are followed in the liquid phase oxidation of olefins having the aforementioned formula. This is in contrast to the case with cycloolefins or branched olefins having the formula,

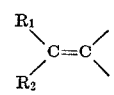

wherein $R_1$ and $R_2$ denote a hydrocarbon radical. In contradistinction the process according to the present invention affords a very smooth progress of the oxidation reaction for the linear olefins.

Examples of inorganic arsenic compounds include arsenic pentoxide, arsenic trioxide or arsenous acid, arsenate, and arsenite. Examples of organic arsenic compounds include arsines and arsenous acid esters which are represented by the formulae, $$R_3As, (RO)_3As, \text{ or } (RO)_mR_nAs$$

wherein the R's may be different from each other, denoting hydrogen or hydrocarbon radical such as alkyl-, cycloalkyl-, aryl radical and $m$ and $n$ are a positive integer, $m$ plus $n$ being equal to 3. Examples of arsenous acid esters include

trimethyl arsenite [(CH₃O)₃As] and

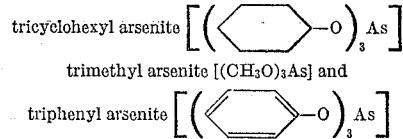

Examples of arsines include

triphenyl arsine and monobutoxy arsine [H₂(C₄H₉O)As]

According to the present invention preferred arsenic compounds employed as the catalyst are those which are soluble in the reaction medium.

The amount of arsenic catalyst employed, according to the present invention, in the reaction medium is usually in the range of 0.001 to 0.5, preferably in the range of 0.01 to 0.1 percent by weight in terms of elemental arsenic.

Another catalyst or initiator may be employed together with the arsenic catalyst in the reaction medium. The combined use of an arsenic catalyst and a polycyano compound having the formula,

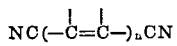

in which $n$ denotes a positive integer gives a remarkable effect.

Examples of the polycyano compound include 1,2,3,4-tetracyano-butadiene (1,3) and derivatives thereof. Examples of said derivatives include metal salts of said tetracyano-butadiene which may be alkali metal salts, alkaline earth metal salts and noble metal salts; and amine salts and phenyl derivatives of said tetracyanobutadiene. (As regards the method for the production of such polycyano compounds, refer to the Nippon Kagaku Zasshi, vol. 85, p. 70; vol. 89, p. 350.) Also employed along with our catalyst are tetracyano ethylene, tetracyanoquinodimethane, and derivatives thereof such as for example a compound in which one or two cyano radicals of tetracyanoethylene are substituted by hydrocarbon radical or hydrogen. A sufficient amount of these polycyano compounds in the liquid reaction medium is usually 0.1 percent by weight or less. However, the polycyano compound is preferably employed in the liquid medium in an amount of 0.0001 to 0.01 percent by weight.

The oxidation reaction usually takes place in a liquid medium. The liquid medium may be a hydrocarbon such as benzene, cyclohexane, or toluene, a halogenated hydrocarbon such as chlorobenzene, chloroform or carbon tetrachloride, a ketone such as acetone, a nitroalkane such as nitromethane or nitroethane, an ester such as acetates, i.e. acetic acid esters, borates, or carbonates, or any other liquid medium which does not adversely affect the oxidation reaction. Examples of preferred media include monoacetyl esters such as methyl acetate, ethyl acetate, isopropyl acetate, butyl acetate, and neopentyl acetate; and polyacetyl esters such as polyhydroxyalkane polyacetyl esters, polyhydroxycycloalkane polyacetyl esters and polyglycol polyacetyl esters such as propylene glycol diacetate.

The employment of the individual acetates mentioned above or of a liquor containing at least 25 percent by weight of said acetates as the liquid reaction medium results in an increased yield of olefin oxide. It is well-known to employ acetates as the liquid reaction medium in the liquid phase oxidation of olefins. However, in prior art methods, the acetate tends to decompose in the course of the reaction. The present invention provides a method in which the reactions take place in the presence of an arsenic catalyst. Further, a substantial reduction of acetate decomposition results.

No limitation is imposed on the amount of liquid reaction medium used. However, in view of the fact that a relatively low concentration of olefin gives better results in the oxidation reaction, the concentration of olefin is usually kept preferably at less than 10 percent by weight.

Reactions take place at a temperature usually in the range of 80° C. to 250° C., preferably in the range of 140° C. to 180° C. If an unduly low reaction temperature is employed the induction period of the reaction is considerably extended and the reaction velocity is decreased. On the other hand, the employment of an unduly high temperature gives rise to undesirable further reaction of the olefin oxide, resulting in a lowered yield thereof. Further, when acetate is used as the reaction medium, the use of unduly high temperature results in acetate decomposition. The reactions may take place at any pressure. However, they are preferably conducted under pressure.

According to our invention, the employment of an arsenic catalyst in a small amount results in a high selectivity to olefin oxide. The selectivity is more than 50 percent. Further, according to our invention, a reaction at high temperatures, continued until a high conversion of olefin is reached, does not appreciably depress the selectivity to olefin oxide. Still further, the method of the present invention affords a tremendous reduction in the decomposition of the reaction medium for example acetate. Thus obvious commercial and economical advantages are realized. In particular, the employment of the aforesaid polycyano compound along with the arsenic catalyst adds to said merits.

The invention will now be described in greater detail with reference to the following examples.

EXAMPLE 1

A 500-milliliter autoclave made of stainless steel is employed. The autoclave is provided with a stirrer and with openings for introducing and discharging gas. 300 ml. ethyl acetate, 500 mg. tricyclohexyl arsenite

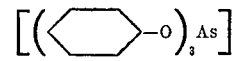

and 10 g. propylene are placed in the autoclave and nitrogen gas is introduced therein under pressure for heating. A temperature of 150° C. is reached when the pressure indicates 55 kg./cm.²G. Oxygen gas is then forced into the autoclave to raise the pressure to 60 kg./cm.²G. The autoclave is in communication with an oxygen bomb so that a reduction in the pressure inside the autoclave to a value lower than 60 kg./cm.²G. automatically results in the admission of oxygen gas to the autoclave via a pressure control valve. After the expiration of an induction period of 40 minutes, reactions begin to take place. After the reaction has continued for 120 minutes, the autoclave is cooled and the contents thereof are analysed. The results are listed as follows:

| | Percent |
|---|---|
| Conversion of propylene | 53 |
| Selectivity to: | |
| Propylene oxide | 56 |
| Acetic acid | 37 |
| Acetaldehyde | 2 |
| Methyl formate | 4 |
| Acetone | 5 |

In this experiment, the consumption of ethyl acetate per mole of product propylene oxide measures 0.2 mole.

EXAMPLES 2–10

The oxidation reaction of propylene is carried out by following the same process of Example 1 and in the same apparatus of Example 1. However, the reaction medium and the catalyst employed are varied. The results are tabulated in the following Table 1.

3,642,834

TABLE 1

| | Experiment Number | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| | Reaction medium: kind | | | | | | | | | |
| | Ethyl acetate | Ethyl acetate | Methyl acetate | Ethyl acetate | Ethyl acetate | Ethyl acetate | Ethyl acetate | Propylene glycol diacetate | Acetone | Acetone |
| Amount used, ml | 300 | 300 | 200 | 300 | 200 | 200 | 200 | 300 | 300 | 300 |
| Catalyst: kind | Tricyclo- hexyl arsenite | Triphenyl arsine | Tricyclo- hexyl arsenite | Arsenous acid [1] | Tricy- clohexyl arsen- ite | Tetra- cyano- ethy- lene | Tricy- clohexyl arsen- ite | Sodium salt of tetra- cyano buta- diene | Arsen- ous acid | Tetra cyano ethyl- ene | Tri- phenyl arsine | Tricyclo- hexyl arsenite | Sodium salt of tetra- cyano buta- diene | Tricyclo- hexyl arsenite | Tetra- cyano ethylene |
| Amount used, mg | 500 | 400 | 300 | 100 | 500 | 500 | 100 | 400 | 100 | 100 | 150 |
| Propylene charged, g | 10 | 20 | 10 | 10 | 10 | 10 | 10 | 10 | 10 | 10 |
| Reaction temperature, ° C | 150 | 150 | 150 | 150 | 150 | 170 | 150 | 200 | 150 | 150 |
| Reaction pressure, kg./cm.² G | 60 | 60 | 60 | 60 | 60 | 60 | 60 | 60 | 60 | 60 |
| Induction period, minutes | 40 | 55 | 35 | 45 | 60 | 12 | 50 | 0 | 22 | 30 |
| Reaction time, minutes | 120 | 165 | 100 | 150 | 120 | 55 | 55 | 15 | 40 | 80 |
| Results of reaction: | | | | | | | | | | |
| Conversion of propylene, percent | 53 | 48 | 45 | 47 | 48 | 64 | 39 | 58 | 24 | 25 |
| Selectivity to propylene oxide, percent | 56 | 54 | 51 | 51 | 52 | 53 | 51 | 49 | 38 | 40 |
| Selectivity to acetic acid, percent | 37 | 47 | 36 | 40 | 31 | 40 | 36 | 37 | 27 | 13 |
| Selectivity to acetaldehyde, percent | 2 | | | | 2 | | | 1 | 2 | 2 |
| Selectivity to methyl formate, percent | 4 | | | | 2 | | | 3 | 2 | 1 |
| Selectivity to acetone, percent | 5 | | | | 4 | | | 4 | | |
| Consumption of reaction medium per mole of propylene oxide, mole | 0.2 | 0.4 | 0.2 | 0.5 | 0 | 0 | 0 | 0 | 0.7 | 0.7 | 0.7 |

[1] Arsenous acid may be referred to as arsenic trioxide.

Comparative Examples 1–3

The oxidation reaction is carried out in the same apparatus of Example 1. Ethyl acetate, propylene glycol diacetate and acetone are employed as reaction media. No catalyst is used. The results are tabulated in the following Table 2.

TABLE 2

| | Experiment number, comparative example | | |
|---|---|---|---|
| | 1 | 2 | 3 |
| | Reaction medium: kind | | |
| | Ethyl acetate | Propylene glycol diacetate | Acetone |
| Amount used, ml | 300 | 300 | 300 |
| Catalyst: kind | None | None | None |
| Amount used, mg | None | None | None |
| Propylene charged, g | 10 | 10 | 10 |
| Reaction temperature, ° C | 150 | 200 | 150 |
| Reaction pressure, kg./cm.² G | 60 | 60 | 60 |
| Induction period, minutes | 30 | 0 | 24 |
| Reaction time, minutes | 100 | 15 | 50 |
| Results of reaction: | | | |
| Conversion of propylene, percent | 46 | 58 | 22 |
| Selectivity to propylene oxide, percent | 43 | 37 | 33 |
| Selectivity to acetic acid, percent | 30 | 29 | 13 |
| Selectivity to acetaldehyde, percent | | 1 | 3 |
| Selectivity to methyl formate, percent | | 3 | 1 |
| Selectivity to acetone, percent | | 3 | |
| Consumption of reaction medium per mole of propylene oxide, mole | 1.4 | 1.5 | 3.8 |

We claim:

1. A process for the preparation of propylene oxide which comprises oxidizing propylene with molecular oxygen in a liquid reaction medium at a temperature of from 80° C. to 250° C. in the presence of an arsenic catalyst which is soluble in said liquid reaction medium, wherein said liquid reaction medium contains at least 25% by weight of an acetic acid ester.

2. A process for the preparation of propylene oxide which comprises oxidizing propylene with molecular oxygen in a liquid reaction medium at a temperature of from 80° C. to 250° C. in the presence of an arsenic catalyst dissolved in said medium in a concentration of 0.001% to 0.5% by weight in terms of elemental arsenic, wherein said medium contains at least 25% by weight of an acetic acid ester.

3. The process according to claim 2, wherein said arsenic catalyst is at least one compound selected from the group consisting of tricyclohexyl arsenite, triphenyl arsine and arsenous acid.

4. The process according to claim 2, wherein said acetic acid ester is selected from the group consisting of methyl acetate, ethyl acetate and propylene glycol diacetate.

5. A process for the preparation of propylene oxide which comprises oxidizing propylene with molecular oxygen in a liquid reaction medium at a temperature of from 80° C. to 250° C. in the presence of an arsenic catalyst and a polycyano compound having the formula $$NC(-\overset{|}{C}=\overset{|}{C}-)_n CN$$

in which $n$ is a positive integer, wherein said medium contains at least 25% by weight of an acetic acid ester, and wherein both the arsenic catalyst and the polycyano compound are dissolved in said medium.

6. The process according to claim 5, wherein said arsenic catalyst is present in an amount of 0.001 to 0.5 percent by weight in terms of elemental arsenic based on the weight of the liquid reaction medium.

7. The process according to claim 6, wherein said polycyano compound is present in an amount of 0.0001 to 0.01 percent by weight based on the weight of the liquid reaction medium.

8. The process according to claim 7, wherein said acetic acid ester is at least one ester selected from the group consisting of methyl acetate, ethyl acetate and propylene glycol diacetate.

9. The process according to claim 7, wherein said arsenic catalyst is at least one compound selected from the group consisting of tricyclohexyl arsenite, triphenyl arsine and arsenous acid.

10. The process according to claim 7, wherein said polycyano compound is at least one compound selected from the group consisting of tetracyanoethylene and tetracyanobutadiene, tetracyanoquinodimethane and derivatives thereof.

References Cited
UNITED STATES PATENTS

| | | | |
|---|---|---|---|
| 2,366,725 | 1/1945 | Gardner | 260—348.5 |
| 3,316,279 | 4/1967 | Fenton | 260—348.5 |

NORMA S. MILESTONE, Primary Examiner